2,795,809

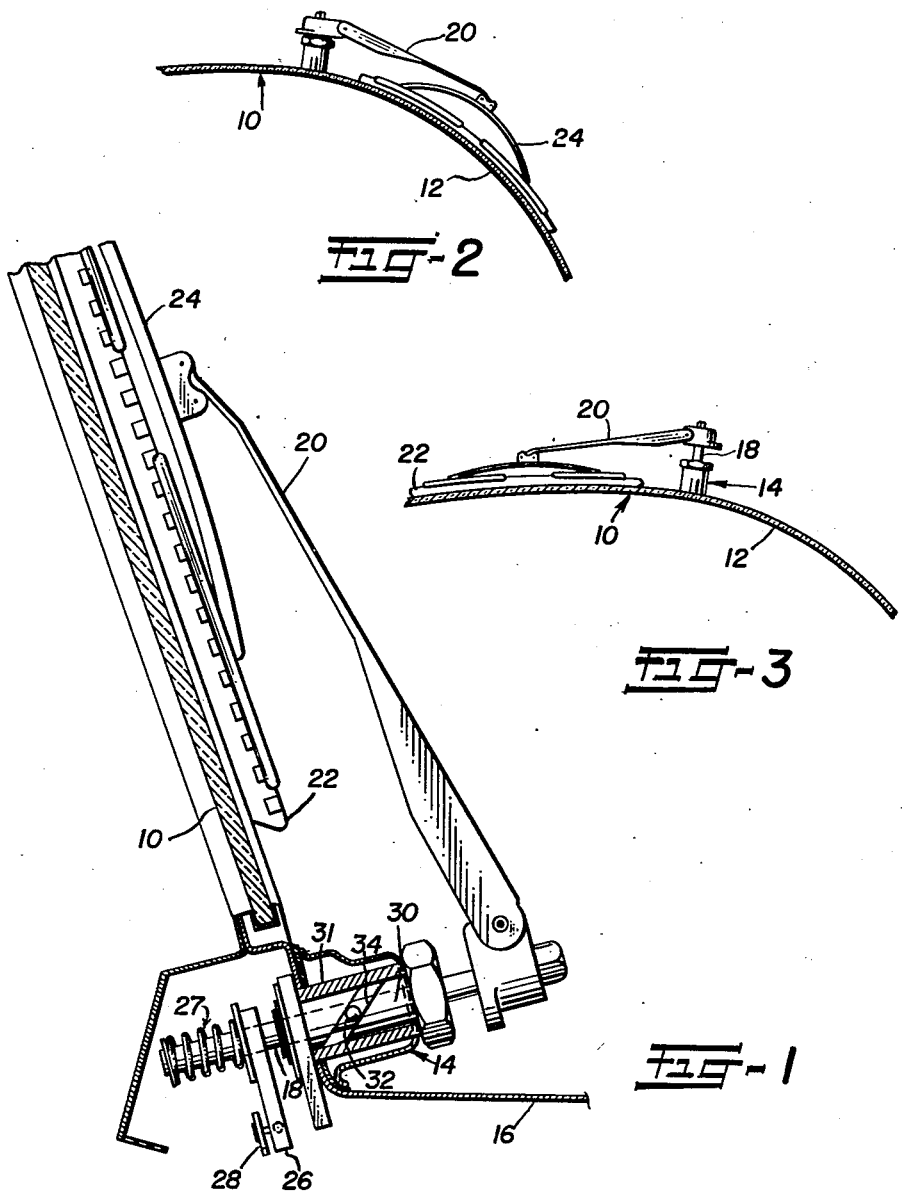

CURVED WINDSHIELD WIPER

George Vischulis, Jr., Noridge, Ill., assignor to Stewart-Warner Corporation, Chicago, Ill., a corporation of Virginia Application February 11, 1954, Serial No. 409,724

1 Claim. (Cl. 15—253)

The present invention relates to oscillating wipers for curved windshields and more particularly to windshield wipers in which continuous contact between a wiper blade and the windshield is facilitated throughout the stroke of the blade by reciprocating a support and operating shaft for the blade in timed relation to rotary oscillations of the shaft and blade.

One object of the invention is to provide for curving windshields an improved oscillating wiper of the above character in which an operating shaft connected to support and oscillate a wiper blade is smoothly and efficiently reciprocated axially as an incident to angular oscillations of the shaft by positive forces in opposite directions of double acting cam structure, contained within the bearing assembly of a compact mount which journals a medial portion of the shaft, the double acting cam structure having an inherent capacity to operate with great efficiency and dependability even at the highest wiper speeds without significantly increasing the peak moment required to oscillate the wiper at any speed.

Other objects and advantages will become apparent from the following description of the form of the invention shown in the drawing, in which:

Figure 1 is a fragmentary vertical sectional view of a windshield wiper incorporating the invention;

Fig. 2 is a plan view of the wiper on a reduced scale showing one extreme position of the wiper blade on a windshield section of varying curvature; and Fig. 3 is a plan view similar to Fig. 2 but showing the wiper blade in the other extreme position of its stroke.

The improved wiper provided by the invention is especially suited for cleaning a curved windshield 10 having a rounded end portion 12 of substantially increased curvature. Only one-half section of the windshield is illustrated in Figs. 2 and 3. As shown, the wiper is supported for oscillation in a mount 14 fixed to the vehicle cowl 16 near the inner end of the rounded windshield section 12.

The wiper includes an operating shaft 18 supported in the mount 14 in a generally horizontal yet somewhat upwardly and outwardly inclined position generally perpendicular to the adjacent portion of the windshield 10. A spring biased support arm 20 attached to the outer end of the shaft 18 carries a wiper blade 22. Springs 24 used in attaching the blade 22 to the arm 20 provide for longitudinal flexing of the blade as it follows the curving windshield surface. The spring supported blade 22 and the spring biased arm 20 are both conventional.

An operating lever 26 is connected to the inner end of the shaft 18 by a spring biased overload release 27 of conventional construction. The outer end of the oscillating lever 26 is connected to a link 28 from an oscillating mechanism (not shown). A detailed description of a suitable oscillating mechanism may be found in the U. S. patent to Dahlgren, No. 2,600,622, particularly as this relates to the wiper structure shown in Figs. 9 and 10 of the patent.

The medial portion of the shaft 18 is journaled in the bore of an elongated bearing and cam bushing 30 fitted into a sleeve 31 supported in the mount 14 and forming with the sleeve a part of the mount. A short cam follower 32 fixed to the operating shaft 18 projects radially from the shaft into a generally helical cam groove 34 formed in the bushing 30.

The cam surfaces of the groove 34 and the cam follower 32 are designed to impart a reversing axial movement to the operating shaft 18 as an incident to rotary oscillating movement of the shaft. The layout of the cam groove 34 in relation to the bushing 30 is designed to move the outer end of the shaft 18 inwardly or toward the windshield, as shown in Fig. 2, when the shaft is rotated to swing the wiper blade 22 onto the sharply curving windshield section 12, which is rather steeply inclined in relation to the mount 14. This axial movement of the operating shaft pulls the entire wiper arm and blade assembly 20, 22 closer to the windshield 10. As a result, optimum pressure is maintained on the wiper blade 22 for efficient cleaning of the sharply curving windshield surface.

On the other hand when the wiper blade 22 is swung toward the other end of its stroke, the follower 32, sliding in the reverse direction in the cam groove 34 moves the shaft 18 and the blade arm 20 outwardly. This prevents the application of excessive wiping pressure to the blade 22 as the blade moves over surface areas of the windshield 10 less steeply inclined in relation to the mount 14.

In this manner, the axial movement of the operating and support shaft 18 for the blade 22 maintains an efficient wiping pressure on the blade throughout its stroke, thus assuring efficient cleaning of the entire windshield surface traversed by the blade. Moreover, the wiper is well suited for efficient operation at high speed in that the wiper blade 22 will not leave the windshield surface during any portion of its stroke.

The wiper structure thus formed is simple and economical in construction. The positive coaction of its component parts to superimpose an axial movement on the rotary oscillating movement of the wiper operating shaft 18 assures dependable long life operation.

While I have shown and described a preferred embodiment of my invention, it will be apparent that variations and modifications thereof may be made without departing from the principles and scope of the invention. I therefore desire, by the following claim, to include all such variations and modifications by which substantially the results of my invention may be obtained through the use of substantially the same or equivalent means.

I claim:

A wiper assembly for a sharply curving windshield, comprising, in combination, a mount adapted to be positioned adjacent a windshield and including a stationary member defining a bore of substantial length extending therethrough, an operating shaft medially journaled in said bore and projecting beyond opposite ends thereof, said stationary member defining a helical type cam groove therein opening along the length of the groove into said bore and bounded on opposite sides along the length of the groove by opposing cam surfaces formed on the stationary member, a cam follower fixed to an intermediate portion of said shaft journaled in said bore and extending radially from the shaft into said cam groove for contact with said opposing cam surfaces, a wiper arm attached to the outer end of said shaft protruding beyond said stationary mount member, a wiper blade carried by the free end of said wiper arm, and oscillating means attached to the inner end of said shaft protruding inwardly from said stationary member of said mount.

References Cited in the file of this patent

UNITED STATES PATENTS

| | | |
|---|---|---|
| 1,982,624 | Barker | Dec. 4, 1934 |
| 2,027,365 | Barker | Jan. 14, 1936 |
| 2,079,339 | Drew | May 4, 1937 |
| 2,336,007 | Fuller | Dec. 7, 1943 |
| 2,412,319 | Carey | Dec. 10, 1946 |